United States Patent Office 3,388,109
Patented June 11, 1968

3,388,109
NOVEL POLYMERIZATION CATALYST BASED ON HYDROGEN PEROXIDE AND THIOGLYCOLIC ACID
James M. Hawkins and Donald J. Shields, Kingsport, Tenn., assignors to Eastman Kodak Company, Rochester, N.Y., a corporation of New Jersey
No Drawing. Continuation-in-part of application Ser. No. 328,118, Dec. 4, 1963. This application Nov. 16, 1966, Ser. No. 594,659
7 Claims. (Cl. 260—80)

ABSTRACT OF THE DISCLOSURE

A catalyst combination of hydrogen peroxide and at least one compound represented by the formula

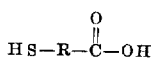

wherein R is an alkyl radical containing from 1 to 18 carbon atoms, has been found to form good yields of polymer having an inherent viscosity above 0.5 at temperatures less than 50° C. The preferred catalyst combination is hydrogen peroxide and at least one member selected from the group consisting of thioglycolic acid, α-mercaptoproprionic acid and β-mercaptoproprionic acid.

---

This application is a continuation of application Ser. No. 328,118 filed Dec. 4, 1963, now abandoned.

This invention relates to homo- and copolymerizations of chemically unsaturated materials and particularly concerns novel catalyst systems for such polymerizations.

In the field of polymer chemistry, it is especially desirable for most polymer applications to employ a catalyst which will give a good yield of high inherent viscosity (above 0.5) polymer at a commercially practicable rate. The high I.V. is necessary for such properties as toughness which is required for films, fibers, and molded articles in general. Moreover, for many applications the color of the polymer should be stable.

Objects of the invention therefore are: to provide a process for forming high-I.V., tough, color-stable polymers at high rates and in good yields; and to provide improved catalysts for aiding in this process.

These and other objects have been achieved in accordance with the present invention through the discovery that hydrogen peroxide, when activated with at least one compound represented by the formula

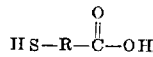

wherein R is a member selected from the group of divalent hydrocarbon radicals containing from 1–18 carbon atoms, at low temperatures, rapidly promotes high-I.V. polymer formation in good yield without adversely affecting polymer color stability. In a more specific sense, the novel catalyst systems comprise hydrogen peroxide and a mercaptocarboxylic acid selected from the group consisting of thioglycolic acid (mercaptoacetic acid), α-mercaptopropionic acid and β-mercaptopropionic acid, with the thioglycolic acid being the most effective and therefore preferred.

The unexpectedness of such results is evidenced by the fact that activators, and in particular mercaptans, are known to prevent high-molecular-weight and high-I.V. polymer formation by virtue of their chain transfer activity; see Vinyl and Related Polymers, Schildknecht, p. 99.

The hydrogen peroxide component of the catalyst system is of course a well-known free radical generator. Its commercial use however is limited by its low catalyzing activity at temperatures less than 50° C. This low activity was demonstrated by charging 75 parts of styrene, 25 parts of acrylonitrile, 0.1 part of phosphoric acid, 5 parts of Igepal CO-850 [nonylphenoxypoly(ethylenoxy)ethanol], 300 parts of deoxygenated water and 1.0 part of hydrogen peroxide to a reaction vessel maintained at 25° C. The contents were observed over a 24-hour period and no reaction was evident.

At temperatures above 50° C., e.g., hydrogen peroxide does become a more active polymerization catalyst, but at such temperatures the polymers formed had extremely high inherent viscosities and an objectional color formation. For example, a 75/25 styrene/acrylonitrile polymer made using 1.0% of $H_2O_2$ at 50° C. had an I.V. of 6.45.

As taught by the prior art, the catalytic activity of hydrogen peroxide at lower temperatures may be markedly improved by activating the same with inorganic salts such as ferrous ammonium sulfate, but the residues of these activators in the polymer induce color instability. For example, iron residues from the ferrous ammonium sulfate lead to polymers that discolor severely under normal molding conditions.

According to the present invention, hydrogen peroxide is activated with the aforesaid mercaptocarboxylic acids which leave only innocuous residues in the polymer. It is noted that these mercapto acids are color stabilizers in their own right and residues thereof actually enhance color stability. It is also notable that an additional advantage of these acids is their solubility in water which allows them to be readily washed from the polymer, if desired. Moreover, these acids are particularly effective in aqueous systems and at temperatures of less than 50° C. produce polymer in excellent yield having an I.V. of less than .8. The weight ratio of these activators to hydrogen peroxide may be varied between about 0.05/1 to about 1/1, with 0.2/1 to 0.4/1 being preferred for most polymerizations. The preferred concentration of catalyst is between about 0.5 to about 2.0% by weight of the total monomer although other concentrations may be employed, depending upon the desired speed, etc. of the reaction. The present catalyst systems are effective in the pH range from about 1.5 to about 8 with a pH between 3 and 5 being preferred. These systems are also effective for homogenous and heterogenous aqueous polymerizations.

Where the polymerizations of water-insoluble monomers such as styrene, vinyl acetate, acrylic and methacrylic esters, are carried out, any of a wide variety of surfactants or dispersing agents may be employed without affecting the operation of these catalyst systems. Surfactants useful for dispersing such monomers include Duponol ME (sodium lauryl sulfate), Aerosol OT (dioctyl ester of sodium sulfosuccinic acid), Igepal CO-850 [nonylphenoxypoly(ethyleneoxy)ethanol], and Ultrawet 30 DS (alkyl benzene sodium sulfonate). Other mercaptans, such as normal or tertiary dodecyl mercaptans, are useful as chain transfer agents and may be admixed with the present activators if desired.

As aforesaid, the present catalyst systems are effective for the bulk, solution or suspension homo- or copolymerizations, whichever method is most desirable for the particular monomer or monomers, of a large variety of monomers including acrylic and methacrylic acids and their esters, amide and nitrile derivatives, styrene and its derivatives, vinyl esters, dienes, and olefins such as ethylene and propylene. A comprehensive list of applicable monomers is found in U.S. Patent No. 2,396,785.

The following examples will serve to further illustrate the invention. In these examples the rate of reaction is roughly inversely proportional to the induction period. Polymerizations having induction periods of longer than about 10 minutes have been found commercially impractical. The toughness of the polymer product is roughly proportional to its I.V., products having I.V.'s below about 0.50 being too brittle for many applications. Polymers having I.V. of greater than 2 cannot be molded by conventional methods as the polymer degrades before melting.

Example No. 1

This example shows that hydogen peroxide when activated with thioglycolic acid does polymerize styrene and acrylonitrile in high yields at 25° C. to give useful, high I.V. product.

Seventy-five parts of styrene, 25 parts of acrylonitrile, 0.1 part of phosphoric acid, 5 parts of Igepal CO-850, 300 parts of deoxygenated water, 1 part of hydrogen peroxide and 0.3 part of thioglycolic acid were charged to a stirred reaction vessel and maintained at 25° C. Polymerization, as evidenced by the formation of insoluble polymer, began after an induction period of 6 minutes. The product, which was obtained in 97% yield after 6 hours, had an I.V. of 0.87. The color stability was determined by heating a sample of the polymer for 5 minutes at 200° C., and comparing its color with standard color controls. Color controls were rated 1–16, 1 being pure white and 16 being the brown color developed when a persulfate/bisulfite catalyst is used. The polymer prepared above had a color rating of 3. This was whiter than most commercial plastics and permitted the preparation of clear, true colors from standard pigments incorporated in molded specimens of the polymer.

Example No. 2

This example shows that the hydrogen peroxide-thioglycolic acid system is also an effective polymerization catalyst at 70° C.

Seventy-five parts of styrene, 25 parts of acrylonitrile, 0.1 part of phosphoric acid, 5 parts of Igepal CO-850, 300 parts of deoxygenated water, 1 part of hydrogen peroxide and 0.3 part of thioglycolic acid were charged to a reaction vessel and the temperature thereof raised to 70° C. The polymerization was observed after an induction period of 6 minutes. After 4 hours, a 98% yield of product having an I.V. of 0.75 and a color rating of 3 was obtained.

Example No. 3

This example shows that other mercaptans may be used with the thioglycolic acid.

Seventy-five parts of styrene, 25 parts of acrylonitrile, 0.1 part of phosphoric acid, 5 parts of Igepal CO-850, 300 parts of deoxygenated water, 1 part of hydrogen peroxide, 0.3 part of thioglycolic acid, and 0.1 part of TDM were charged to a reaction vessel maintained at 25° C. Polymerization was observed after an induction period of 5 minutes. After 6 hours, a 95% yield of a polymer having an I.V. of 0.52 was obtained. The polymer was white in color. (TDM is tert-dodecyl mercaptan.)

The following examples illustrate the utility of other mercaptocarboxylic acids as activators for $H_2O_2$.

Example No. 4

This example shows that hydrogen peroxide when activated with β-mercaptopropionic acid, does polymerize styrene and acrylonitrile in good yields at 25° C. to give a useful, medium-high I.V. product.

This run was carried out in the identical manner to Example I except that 0.3 part of β-mercaptopropionic acid was used instead of thioglycolic acid. Polymerization began after an induction period of 8 minutes. The product, obtained in 90% yield in 10 hours, had an I.V. of 0.7 and a color stability rating of 4.

Example No. 5

This example shows that hydrogen peroxide when activated with α-mercaptopropionic acid polymerizes styrene and acrylonitrile in good yields at 25° C. to give a useful, medium-high I.V. product.

This run was carried out in the identical manner to Example 1 except that 0.3 part of α-mercaptopropionic acid was used instead of thioglycolic acid. Polymerization began after an induction period of 8 minutes. The product, obtained in 92% yield in 8 hours, had an I.V. of 0.75 and a color stability rating of 5.

The following example illustrates the relatively inferior color stability resulting from the use of other peroxidic catalysts.

Example No. 6

Sixty-eight parts of styrene, 32 parts of acrylonitrile, 900 parts of $H_2O$, 1.0 part of ammonium persulfate, 0.75 part of sodium metabisulfite, 1.0 part of TDM, 3.75 parts of Alipal CO-436 [ammonium salt of a sulfate ester of an alkylphenoxypoly (ethyleneoxy) ethanol], and 1.25 parts of Igepal CO-850, were placed in a standard polymerization vessel for 15 hours at 50° C. The polymer had an I.V. of 0.6 and a poor color stability rating (brown) of 15.

The following examples illustrate the utility of the present catalyst systems for polymerizing a variety of monomers without adversely affecting the color stability of the products.

Example No. 7

The same procedure as in Example 1 was followed, except that methacrylonitrile was used in place of styrene. The polymer yield was 90%, I.V. was 0.8, and the color stability rating was 5.

Example No. 8

The same procedure as in Example 1 was followed, except that α-methylstyrene was used in place of styrene. The polymer yield was 91%, I.V. was 0.75, and the color stability rating was 5.

Example No. 9

The same procedure as in Example 1 was followed, except methyl methacrylate was used in place of acrylonitrile. The polymer yield was 94%, I.V. was 0.85, and the color stability rating was 5.

The following example illustrates the use of the present catalyst in a bulk polymerization.

Example No. 10

$H_2O_2$ and thioglycolic acid were added to a 70/30 styrene/methyl methacrylate mixture. After heating at 20° C. for 15 hours, a 92% yield of polymer having an I.V. of 1.0 and a color stability rating of 4 was obtained.

The following example illustrates the use of the present catalyst in a solution polymerization.

Example No. 11

The same procedure as in Example 12 was used except that it was carried out in a volume of benzene equal to twice the volume of monomers. The product obtained in 85% yield had an I.V. of 0.7 and a color stability rating of 5.

Example No. 12

The following table shows the results obtained by repeating Example 1 at temperatures of 10, 20, 30, 40 and 50° C.

TABLE I

| Temperature, °C. | Percent Conversion | I.V. |
|---|---|---|
| 10 | 83.1 | 0.66 |
| 20 | 88.6 | 0.69 |
| 30 | 93.2 | 0.73 |
| 40 | 96.7 | 0.74 |
| 50 | 94.3 | 0.81 |

Example No. 13

The following table shows the results obtained by repeating Example 1 at temperatures of 10, 20, 30, 40 and 50° C. without thioglycolic acid.

TABLE II

| Temperature, °C. | Percent Conversion | I.V. |
|---|---|---|
| 10 | (1) | |
| 20 | (1) | |
| 30 | (1) | |
| 40 | (2) | |
| 50 | 87.3 | 6.03 |

1 No polymer.
2 Slight indication of some polymer.

Example No. 14

The following table shows the results obtained by repeating Example 1 at temperatures of 10, 20, 30, 40 and 50° C. using 0.3 part of tert-dodecyl mercaptan in place of thioglycolic acid.

TABLE III

| Temperature, °C. | Percent Conversion | I.V. |
|---|---|---|
| 10 | | |
| 20 | | |
| 30 | (1) | |
| 40 | 78 | 0.64 |
| 50 | 93.0 | 0.64 |

1 Slight indication of some polymer.

The invention has been described in detail with particular reference to preferred embodiments thereof, but will be understood that variations and modifications can be effected within the spirit and scope of the invention as described hereinabove and as defined in the appended claims.

We claim:

1. A process for polymerizing ethylenically unsaturated polymerizable material to form polymer having an inherent viscosity of at least 0.5 up to 2.0, comprising contacting materials selected from the group consisting of acrylic acid, methacrylic acid and their esters, acrylamide, methacrylamide, acrylonitrile, methacrylonitrile, styrene and vinyl esters at a temperature less than 50° C. and a pH range from about 1.5 to about 8 with a catalyst comprising hydrogen peroxide and at least one mercapto carboxylic acid represented by the formula

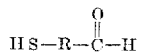

wherein R is an alkyl radical containing from 1–18 carbon atoms, the weight ratio of said mercaptocarboxylic acid to hydrogen peroxide being between about 0.05/1 to about 1/1.

2. A process according to claim 1 wherein said catalyst is hydrogen peroxide and thioglycolic acid.

3. A process according to claim 2 wherein said catalyst is used in an amount of from about 0.5 to about 2.0%, by weight, based on the amount of polymerizable ethylenically unsaturated polymerizable material.

4. A process according to claim 3 wherein said catalyst comprises hydrogen peroxide and thioglycolic acid in a weight ratio of from about 0.2/1 to about 0.4/1.

5. The process of claim 1 wherein the mercaptocarboxylic acid is selected from the group consisting of thioglycolic acid, α-mercaptopropionic acid and β-mercaptopropionic acid.

6. The process of claim 5 wherein the mercaptocarboxylic acid is α-mercaptopropionic acid.

7. The process of claim 5 wherein the mercaptocarboxylic acid is β-mercaptopropionic acid.

References Cited

UNITED STATES PATENTS 2,635,090  4/1953  Basdekis _____ 260—85.5

JOSEPH L. SCHOFER, *Primary Examiner.*

H. WONG, JR., *Assistant Examiner.*

UNITED STATES PATENT OFFICE
CERTIFICATE OF CORRECTION

No. 3,388,109

June 11, 1968

James M. Hawkins et al.

It is certified that error appears in the above identified patent and that said Letters Patent are hereby corrected as shown below:

Column 1, line 67, "Vinyl and Related Polymers" should be italicized. Column 3, line 3, after "having" insert -- an --; line 8, after "give" insert -- a --. Column 6, lines 6 to 8, the formula should appear as shown below:

Signed and sealed this 10th day of March 1970.

(SEAL)
Attest:

Edward M. Fletcher, Jr.
Attesting Officer

WILLIAM E. SCHUYLER, JR
Commissioner of Patents